Dec. 12, 1967     O. FLORIAN     3,357,154
DEVICE FOR DEPOSITING ARTICLES
Filed Aug. 17, 1965     2 Sheets-Sheet 2
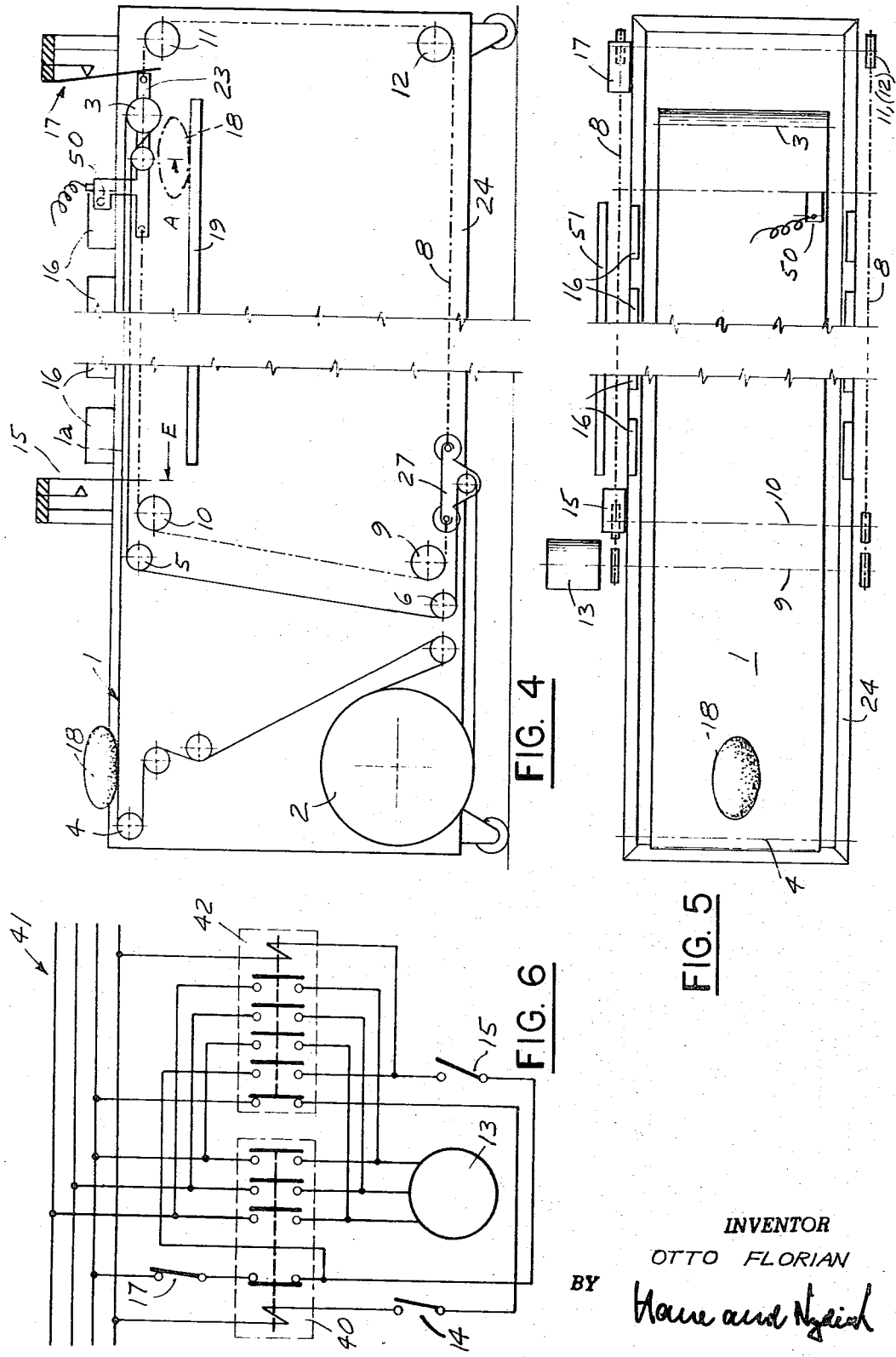
INVENTOR
OTTO FLORIAN
BY
ATTORNEYS United States Patent Office 3,357,154
Patented Dec. 12, 1967

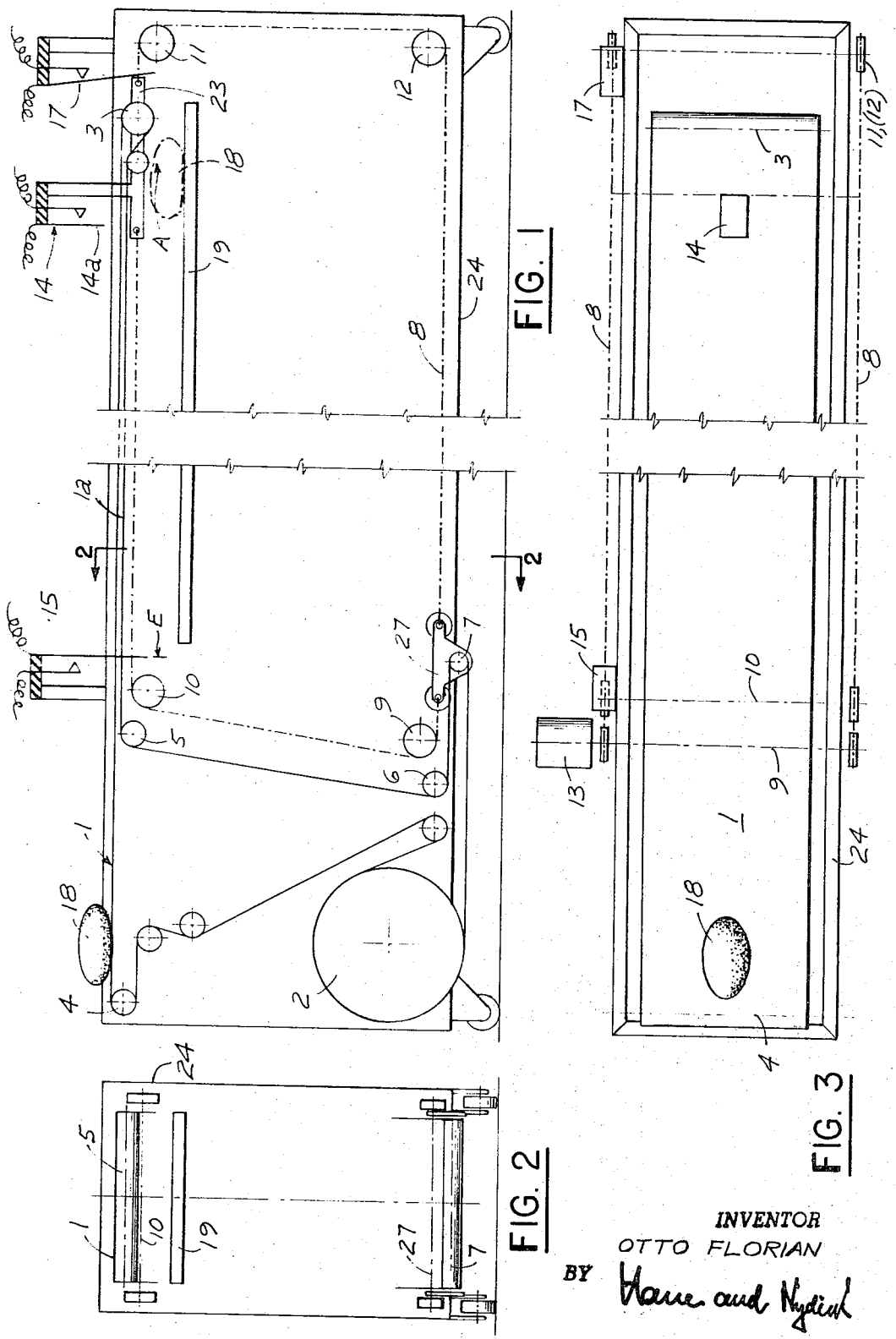

3,357,154
DEVICE FOR DEPOSITING ARTICLES
Otto Florian, Vienna, Austria, assignor to Werner & Pfleiderer, Stuttgart-Feuerbach, Germany, a company of Germany
Filed Aug. 17, 1965, Ser. No. 480,417
Claims priority, application Austria, Aug. 20, 1964,
A 7,205/64
12 Claims. (Cl. 53—59)

The present invention relates to a device for depositing articles on a receiver in a lengthwise substantially uniformly spaced relationship and more particularly, to a device for transferring substantially alike articles, such as pieces of dough, from a conveyor upon which the articles are placed in lengthwise random spaced relationship to a receiver, such as a tray, in lengthwise substantially uniformly spaced relationship.

There is known a device for automatically transferring pieces of dough from a feed conveyor to a receiver such as a tray. In the device as heretofore known an endless conveyor guided over pulleys or rollers is interposed between the feed conveyor and the receiver. The interposed conveyor band includes a loop loaded by a weight and is guided over a roller including a locking mechanism to prevent reverse rotation and over a slide displaceable in a frame structure. The intermediate conveyor is movable step-by-step by means of the slide, depending upon the dough pieces supplied by the feed conveyor. The length of each step of the intermediate conveyor is adjustable and after the intermediate conveyor is fully loaded with dough pieces, the lower strand of the conveyor can be returned into its initial position while the upper strand remains stationary for the purpose of depositing the dough pieces on the receiver. The adjustment of the spacings between the dough pieces is effected by means of a stepper switch which is actuated by the dough pieces on the feed conveyor.

A device of this kind has the disadvantage that in actual practice unavoidable and uncontrollable displacements of the dough pieces occur when the same are transferred from the feed conveyor to the intermediate conveyor. Such displacement of the dough pieces may occur, for instance, by sliding of the dough pieces. Accordingly, the dough pieces will be deposited on the receiver with unequal spacings when the pieces have such unequal spacings while being on the intermediate conveyor, since the device does not provide for any adjustment of the positions of the dough pieces subsequent to the transfer thereof from the feed conveyor upon the intermediate conveyor. A further disadvantage of the known device is tht the same is very complex and hence expensive. It requires not only a roller including a locking mechanism, but also one of several cam discs and cam follower assemblies coacting therewith.

It is a broad object of the invention to provide a novel and improved device of the general kind above referred to by means of which the articles are deposited or placed on the receiver in a substantially uniformly spaced relationship, irrespective of the initial positioning of the articles.

A more specific object of the invention is to provide a novel and improved device of the general kind above referred to in which the final positioning of the articles is controlled by the positions of the articles on the intermediate conveyor rather than by the positions of the articles on the feed conveyor. Accordingly, any displacements of the articles when the same are transferred from the feed conveyor to the transport conveyor are without effect upon the final positions of the articles on the receiver because such displacements are corrected while the articles travel on the transport conveyor.

Another more specific object of the invention is to provide a novel and improved device of the general kind above referred to which is simple in construction, inexpensive in manufacture and reliable in operation.

The aforepointed out objects, features and advantages which will be pointed out hereinafter, are attained by providing at the discharge end of the transport conveyor a guide means, such as a pulley, which is displaceable in the direction opposite the direction of travel of the transport conveyor and substantially parallel to the path of travel of the conveyor section supporting the articles. Displacement of the guide pulley will cause a corresponding spatial displacement of the discharge end of the conveyor in reference to the receiver underneath so that articles successively reaching the discharge end of the conveyor will fall in lengthwise spaced relationship upon the receiver. The displacement of the guide roller and with it the spatial position of the discharge end of the conveyor are controlled by control means which, in turn, are controlled by an article arriving in a predetermined position in reference to the receiver. The control of the drive means for displacing the guide roller is such that the latter is displaced through a predetermined uniform distance in response to each activation of the control means by an article. In other words, the guide pulley is displaced step-by-step and as the steps are of equal length, the spacings of the articles on the receiver are and must be uniform.

The guide pulley and the discharge end of the transport conveyor are coupled to a reversible drive means, preferably by means of an endless transmission means, such as a chain or a belt guided over suitable idlers and pulleys. As a matter of space economy, the chains or belts by means of which the guide pulley is displaced, may encompass the receiver.

The control for the drive means may be obtained by providing just above the guide pulley and secured thereto an electrically or electronically operating detecing means. This detecting means is tripped by the arrival of an article and causes, when tripped, a displacement of the guide pulley and with it of the discharge end of the transport conveyor by one step which, in turn, causes the respective article to fall from the conveyor upon the receiver. The detecting means may be a switch which is moved from one switching position to another switching position by engagement with an article, or it may be a photoelectric control device, the light of which is intercepted when an article passes between the source of light and the photocell of the device. Such interruption of the beam of light impinging upon the photocell may be utilized in a conmentional manner to activate the drive means.

In addition to the control means controlled by the arrival of an article at the position for depositing it on the receiver, a second control means is preferably provided which is activated when the guide pulley has travelled step-by-step from a starting position to an end position, that is, to a position in which the entire receiver is charged with articles. The second control means may be so arranged that it will activate the drive means for returning the guide pulley and with it the discharge end of the transport conveyor into the starting position with a continuous drive.

A third control means may be provided adjacent to the starting position of the guide pulley. This third control means, when operated, serves to stop the drive means after the same have returned the guide pulley into the starting position.

In the event displacement of the guide pulley by steps of uniform length is controlled by a photoelectric device, stationary shields are preferably provided in lengthwise spacing along the portion of the transport conveyor supporting the articles. These shields serve to interrupt the light for a predetermined distance of movement of the guide pulley, thereby assuring uniformity of the steps.

In the accompanying drawing, several preferred embodiments of the invention are shown by way of illustration and not by way of limitation.

In the drawing:

FIG. 1 is an elevational digrammatic view of a device according to the invention in which the deposition of articles is controlled by switch means;

FIG. 2 is a section taken on line II—II of FIG. 1;

FIG. 3 is a plan view of FIG. 1;

FIG. 4 is an elevational view, similar to FIG. 1, but showing photoelectric control means for controlling the deposition of articles upon a receiver;

FIG. 5 is a plan view of FIG. 4; and

FIG. 6 is a circuit diagram showing the circuitry required for operation of the control means.

Referring first to FIGS. 1, 2, 3 and 6 in detail, the exemplified device comprises a transport conveyor 1 which is guided over pulleys or idlers 3, 4, 5, 6, 7, as it is clearly shown in FIG. 1. The conveyor is driven by a suitable drive means 2, such as an electric motor, continuously and with uniform speed. Articles, such as pieces of dough 18, of substantially equal shape are fed upon the conveyor 1 in lengthwise random distribution from a feeding means which is not illustrated and should be visualized as being conventional. The pulleys and idlers, motor 2 and all other components of the device, which will be hereinafter more fully described, are supported by a frame structure 24 of suitable design. The frame structure may be mounted on wheels as it is indicated, but it should be understood that the frame structure as such does not constitute part of the invention and is hence not described in detail.

Dough pieces 18 placed upon conveyor 1 are to be deposited upon a receiving base, such as a tray 19, which is stationarily, though preferably removably, mounted on the frame structure underneath a section 1a of conveyor 1 carrying the dough pieces to be deposited. This section of the conveyor travels along a rectilinear path and receiver tray or table 19 is mounted parallel thereto.

At guide pulley 3 the conveyor 1 is so guided that the conveyor makes an abrupt and pronounced change in its direction of travel. Accordingly, the conveyor, when passing over pulley 3, forms a discharge end. Instead of providing a pulley, any suitably designed guide means may be provided for the same purpose.

While pulleys or idlers 4, 5 and 6 are spatially stationary, pulleys 3 and 7 are both displaceable in either direction along a path preferably parallel to the path of travel of section 1a of conveyor 1 carrying dough pieces 18. However, it should be noted that pulley 7 may be displaced along a path other than one parallel to the path of pulley 3. Pulleys 3 and 7 are drivingly coupled by a transmission means. This means is shown as two chains 8 which are secured at one end to pulley 3, preferably by a spanner 23, and at the other end to pulley 7, preferably by a spanner 27, to permit adjustment of the chain tensions. As it is evident, displacement of pulley 3 toward the left will cause a corresponding displacement of pulley 7 towards the right, that is, pulley 3 can be moved between an initial position A and an end position E for a purpose which will be more fully explained hereinafter. Chains 8 are suitably guided over chain wheels 9, 10, 11 and 12. One of the chain wheels, such as wheel 9, is a driving wheel and coupled for this purpose to a reversible drive motor 13 as it is shown in FIG. 3.

The position of guide pulley 3 and with it the spatial position of the afore-explained discharge edge of conveyor section 1a are controlled by three control means. The first control means is exemplified by a normally open switch 14. This switch is mounted on the mounting means for pulley 3, that is, on spanner 23 for displacement in unison therewith. The switch or, more specifically, the movable switch arm 14a thereof, is so arranged that the switch is closed by engagement with a dough piece 18 arriving at the switch arm. The second control means is exemplified by a normally open switch 15. This switch is so placed that it is closed when spanner 23 has been displaced from the position A into the position E.

The third control means is exemplified by a normally closed switch 17 which is opened when the spanner 23, and with it guide pulley 3 and conveyor 1 are returned into the A position as shown in FIG. 1.

Turning now to the circuit diagram of FIG. 6, this figure shows that closing of switch 14 closes an energizing circuit for a relay 40. The relay is a time-delay relay, that is, a relay which maintains its contact closed for a predetermined period of time after being energized. The relay, upon closing of switch 14, connects motor 13 which is shown by way of example as a three-phase motor, to a suitable source of current 41. Accordingly, closing of switch 14 by a dough piece 18 starts the motor 13 in a predetermined direction and for a predetermined period of time. Instead of using a time-delay relay, any other suitable and conventional timing device may be provided. Switch 14 may, for instance, initiate a cam controlled timing device which, upon closing of the switch, starts the motor and stops it again after a predetermined number of rotations of a cam disc of the device. A specific type of timing device is not essential for the invention. Many known timing devices are suitable for the purpose of the invention.

Closing of switch 15 by engagement with guide pulley 3 or spanner 23 closes an energizing circuit for a second relay 42 via the respective contact arm of relay 40, which arm is closed when the relay is de-energized, and normally closed switch 17. As a result, relay 42, which is normally in the position shown in FIG. 6, closes its contacts thereby establishing an energizing circuit for motor 13. Accordingly, this motor is again started though in opposite direction due to phase reversal as shown in FIG. 6.

Finally, opening of normally closed switch 17, upon return of spanner 23 into the position shown in FIG. 1, interrupts the energizing circuit of relay 42 and thus the afore-described energizing circuit of motor 13. Relay 42 is a fast acting relay so that the motor is stopped immediately upon opening of switch 17 and remains stopped when switch 17 is reclosed, switch 15 being open.

The device as hereinbefore described operates as follows:

At the beginning of each cycle of operation, guide pulley 3 is in its A position. Let it now be assumed that dough pieces 18 are successively fed upon conveyor 1 at lengthwise random spacing and that the foremost dough piece engages and thus closes switch arm 14a. As a result, motor 13 is energized for a predetermined period of time and accordingly displaces guide pulley 3 and with it the dischcarge edge of conveyor section 1a towards the left by a predetermined distance. As a result, the foremost dough piece 18, which has caused operation of switch 14, falls down upon receiving tray 19 as it is indicated in dotted lines. When now the next dough piece operates switch 14, the sequence of operation is repeated and the second dough piece is deposited on receiving tray 19 at a predetermined spacing from the first piece. The same step-by-step displacement of guide pulley 3 is repeated until the table is fully loaded and the guide pulley reaches the end position E in which it closes switch 15. As a result, motor 13 is started in opposite direction and returns the guide pulley and its mounting means or spanner 23 into the A position in a continuous drive. In the A position, switch 17 is temporarily opened thereby stopping motor 13.

During the return of guide pulley 3, the full table 19 may be removed and replaced by an empty table.

The entire device is now ready for the beginning of a new cycle.

The device according to FIGS. 4 and 5 employs the same principle as the previously described device and the same numerals are employed to designate corresponding components. The only difference between the device of FIGS. 1, 2 and 3 and the device of FIGS. 4 and 5 is that in the latter device the control switch 14 is replaced by a photoelectric control. The photoelectric control should be visualized as being of conventional design. It comprises a photocell indicated at 50. This photocell is supported on the mounting means of guide pulley 3, such as spanner 23, and hence is displaced in unison with the guide pulley. The photocell is sensitive to light which may be supplied by a light bar 51 disposed along one or both sides of conveyor section 1a, or by ambient light. When a dough piece 18 moves in front of the photocell, the resulting change in the light impinging upon the cell causes the same to initiate the same switching operations as before described for switch 14 in connection with FIG. 6. The photocell is connected to the circuitry of the motor by suitable means, such as a swing cable 28 connected at one end to the photocell or the associated components thereof, and at the other end to a convenient stationary point so that the cable can follow the movements of the guide pulley.

The time control, which is obtained in the device of FIG. 1 by a special timing means, such as relay 40, may be obtained in the device of FIGS. 4 and 5 by providing a plurality of stationary lengthwise spaced light shields 16 on one or both sides of the conveyor. As it is evident, these light shields will control the light incident upon the photocell in the same manner as it is controlled by a dough piece moving in front of the photocell. Accordingly, the photocell will maintain the motor circuit closed until the guide pulley 3 has travelled through a distance corresponding to the length of the respective shield 16. As these shields are all of equal length, the dough pieces will be deposited on the receiving table 19 equally spaced from each other.

The return of the guide pulley from the end position E into the starting position A is again controlled by switch 15 and the stoppage of the pulley in the position A is controlled by switch 17.

As it is evident, the circuit diagram of FIG. 6 applies to FIGS. 4 and 5 also, except that the relay 40 does not need to be a time-delay relay. In this connection, it may be mentioned that it is, of course, possible to control the motor directly by the switches, that is, without an intermediate relay, but a control by a relay is generally preferable.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for depositing articles on a receiver in a substantially uniformly spaced relationship, said device comprising, in combination:
    a uniformly driven endless conveyor including a substantially rectilinear portion for placing thereon in lengthwise random spaced distribution articles to be deposited;
    an article receiving base stationarily supported below said rectilinear conveyor portion substantially parallel thereto and extending at least part of the length thereof;
    a guide means at one end of the rectilinear conveyor portion to guide the conveyor along a return path below said rectilinear portion;
    support means supporting said guide means, said support means being displaceable parallel to said rectilinear conveyor portion between an initial position above one end of the base and an end position above the other end of the base;
    electric drive means coacting with said support means for displacing the same opposite to the direction of travel of said conveyor portion;
    and control means supported on said support means for displacement in unison therewith, said control means being controlled by each article arriving on the conveyor in a predetermined position in reference to the guide means and controlling the drive means to activate the same, each activation of the drive means displacing the support means and the guide means supported by the same through a predetermined distance toward the end position above the other end of said base;
    whereby articles successively arriving in said predetermined position in reference to the guide means fall from the conveyor upon the base therebeneath, lengthwise spaced from each other by said predetermined distance.

2. A device for depositing articles on a receiver in a substantially uniformly spaced relationship, said device comprising, in combination:
    a uniformly driven endless conveyor including a substantially rectilinear portion for placing thereon in lengthwise random spaced distribution articles to be deposited;
    an article receiving base stationarily supported below said rectilinear conveyor portion substantially parallel thereto and extending at least part of the length thereof;
    a guide means at one end of the rectilinear conveyor portion to guide the conveyor along a return path below said rectilinear portion;
    support means supporting said guide means, said support means being displaceable parallel to said rectilinear conveyor portion;
    reversible electric drive means coacting with said support means for displacing the same in either direction between an initial position above one end of the base and an end position above the other end of the base;
    first control means supported on said support means for displacement in unison therewith, said control means being controlled by each article arriving on the conveyor in a predetermined position in reference to the guide means and controlling the drive means to activate the same, each activation of the drive means displacing the support means and the guide means supported by the same through a predetermined distance in the direction toward the other end of said base whereby articles successively arriving in said predetermined position fall from the conveyor upon the base therebeneath lengthwise spaced from each other by said predetermined distance; and
    second control means for control of the drive means stationarily mounted adjacent to said other end of the base, said second control means engaging said support means in the position thereof above the other end of the base,
    engagement of the control means with the support means activating the drive means for returning the support means into said initial position.

3. A device for depositing articles on a receiver in a substantially uniformly spaced relationship, said device comprising, in combination:
    a uniformly driven endless conveyor including a substantially rectilinear portion for placing thereon in lengthwise random spaced distribution articles to be deposited;
    an article receiving base stationarily supported below said rectilinear conveyor portion substantially parallel thereto and extending at least part of the length thereof;
    a guide means at one end of the rectilinear conveyor portion to guide the conveyor along a return path below said rectilinear portion;
    support means supporting said guide means, said support means being displaceable parallel to said rectilinear conveyor portion;
    reversible electric drive means coacting with said support means for displacing the same in either direction between an initial position above one end of the base and an end position above the other end of the base;

first control means supported on said support means for displacement in unison therewith, said control means being controlled by each article arriving on the conveyor in a predetermined position in reference to the guide means and controlling the drive means to activate the same, each activation of the drive means displacing the support means and the guide means supported by the same through a predetermined distance in the direction toward the other end of said base whereby articles successively arriving in said predetermined position fall from the conveyor upon the base therebeneath lengthwise spaced from each other by said predetermined distance;

second control means for control of the drive means stationarily mounted adjacent to said other end of the base, said second control means engaging said support means in the position thereof above the other end of the base, engagement of said control means with the support means activating the drive means for returning the support means into said initial position; and third control means for control of the drive means stationarily mounted adjacent to said one end of the base, said third control means engaging said support means upon return thereof into said initial position, engagement of the third control means with the support means activating the third control means for deactivating the drive means.

4. A device according to claim 3, wherein said drive means include a reversible motor, and wherein each of said control means comprises a switch means, operation of the switch means of the first control means closing an energizing circuit for rotation of the motor in one direction, operation of the switch means of the second control means closing an energizing circuit for rotation of the motor in opposite direction and operation of the switch means of the third control means disconnecting the circuit for rotation of the motor in said opposite direction.

5. A device according to claim 4, wherein the energizing circuit closed by operation of the first control switch means includes a timing means maintaining the motor circuit closed for a predetermined period of time upon operation of the first control switch means.

6. A device according to claim 4, wherein said first and second control switch means are normally open switch means and said third control switch means is a normally closed switch means.

7. A device according to claim 1, wherein said control means comprises a photoelectric control means including a photo-cell sensitive to light impinging thereupon, said photo-cell being supported on said support means and controlling an energizing circuit for said drive means, each of said articles arriving in said predetermined position causing a change in the light incident upon the photo-cell, said change in light activating the photo-cell to close said energizing circuit for the drive means thereby causing displacement of the support means through said predetermined distance.

8. A device according to claim 7 and comprising a plurality of light shields stationarily mounted along the base in lengthwise spaced relationship, each of said shields substantially blocking the light impinging upon the photo-cell when and while the same is in substantially transverse alignment with the respective light shield during step-wise displacement of the guide means from said initial position toward said end position thereby causing the photo-cell to energize the drive motor for a predetermined distance of travel of the support means in response to each actuation of the photo-cell by an article.

9. A device according to claim 2 and comprising an endless transmission means coupled to said drive means and said support means for rectilinearly displacing the same in either direction.

10. A device according to claim 9, wherein said transmission means comprises an endless flexible element in which is interposed said support means for displacing the latter by driving said element in either direction, and several pulleys guiding said element along a predetermined path, one of said pulleys being a driving pulley drivingly coupled with said drive means.

11. A device according the claim 9 and comprising a frame structure; said conveyor, said base, said movable support means, said drive means for the support means and said control means being supported by said frame structure, and said transmission means including a portion extending from said support means to said drive means underneath said base.

12. A device according to claim 3, wherein said first control means controls said drive means to displace said support means step-by-step in one direction, and wherein said second control means controls said drive means to displace said support means continuously in the opposite direction, and wherein said third control means controls said drive means to stop said support means after displacement thereof through a predetermined distance in said opposite direction.

No references cited.

TRAVIS S. McGEHEE, *Primary Examiner.*